US012638053B2

(12) United States Patent
Horler et al.

(10) Patent No.: US 12,638,053 B2
(45) Date of Patent: May 26, 2026

(54) PUMP, A BEARING ASSEMBLY FOR A PUMP AND A METHOD OF ASSEMBLING THE BEARING ASSEMBLY

(71) Applicant: Edwards Limited, Burgess Hill (GB)

(72) Inventors: Richard Glyn Horler, Burgess Hill (GB); Alexander James Patey, Burgess Hill (GB); Christopher Miles, Burgess Hill (GB); David Student, Lutin (CZ); Tomas Petr, Lutin (CZ)

(73) Assignee: Edwards Limited

( * ) Notice: Subject to any disclaimer, the term of this patent is extended or adjusted under 35 U.S.C. 154(b) by 59 days.

(21) Appl. No.: 18/836,228

(22) PCT Filed: Feb. 14, 2023

(86) PCT No.: PCT/GB2023/050331
§ 371 (c)(1),
(2) Date: Aug. 6, 2024

(87) PCT Pub. No.: WO2023/156765
PCT Pub. Date: Aug. 24, 2023

(65) Prior Publication Data
US 2025/0116298 A1     Apr. 10, 2025

(30) Foreign Application Priority Data

Feb. 16, 2022    (GB) ...................................... 2202041
Aug. 22, 2022    (GB) ...................................... 2212169

(51) Int. Cl.
F16C 27/04         (2006.01)
F04D 19/04         (2006.01)
(Continued)

(52) U.S. Cl.
CPC .......... F16C 33/6685 (2013.01); F04D 19/04 (2013.01); F04D 29/059 (2013.01);
(Continued)

(58) Field of Classification Search
CPC ...... F16C 27/04; F16C 33/581; F16C 33/586; F16C 33/6681; F16C 33/6685;
(Continued)

(56) References Cited

U.S. PATENT DOCUMENTS 4,181,379 A * 1/1980 Letts ................... F16C 33/6648
384/465
4,209,178 A    6/1980 MacKenzie
(Continued)

FOREIGN PATENT DOCUMENTS

CN        202338510 U      7/2012
CN        204327771 U      5/2015
(Continued)

OTHER PUBLICATIONS

JP2003343588A_Description.*
(Continued)

*Primary Examiner* — Phillip A Johnson
(74) *Attorney, Agent, or Firm* — Theodore M. Magee; Westman, Champlin & Koehler, P.A.

(57)                ABSTRACT
A bearing assembly, method of assembling a bearing assembly and a pump are disclosed. The bearing assembly is for mounting a rotatable shaft of a pump, and comprises an inner ring and an outer ring and a plurality of rollable elements mounted between said inner and outer rings. The bearing assembly has a lubricant directing element extending radially outwards from an outer circumference of the inner ring. The lubricant directing element may comprise a sloped radial surface, at least a portion of the sloped radial surface facing an annular gap between the inner and outer rings, a radially inner portion of the sloped surface being closer to the rollable elements than a radially outer portion of the sloped surface.

21 Claims, 5 Drawing Sheets

(51) Int. Cl.

| | |
|---|---|
| *F04D 29/059* | (2006.01) |
| *F04D 29/063* | (2006.01) |
| *F16C 19/06* | (2006.01) |
| *F16C 33/58* | (2006.01) |
| *F16C 33/66* | (2006.01) |
| *F16C 35/077* | (2006.01) |

(52) U.S. Cl.
CPC ............ *F04D 29/063* (2013.01); *F16C 19/06* (2013.01); *F16C 27/04* (2013.01); *F16C 33/586* (2013.01); *F16C 33/6681* (2013.01); *F16C 35/077* (2013.01); *F16C 2360/44* (2013.01); *F16C 2360/45* (2013.01)

(58) Field of Classification Search
CPC ............... F16C 33/7889; F16C 35/077; F16C 2360/44; F16C 2360/45; F04D 19/04; F04D 29/059; F04D 29/063
See application file for complete search history.

(56) References Cited

U.S. PATENT DOCUMENTS

| | | | | |
|---|---|---|---|---|
| 4,365,851 | A | * | 12/1982 | Andres ............... F16C 33/6622 |
| | | | | 384/465 |
| 4,884,903 | A | | 12/1989 | Pham et al. |
| 5,000,587 | A | | 3/1991 | Hawley |
| 2004/0062461 | A1 | | 4/2004 | Johnson et al. |
| 2008/0112660 | A1 | * | 5/2008 | Koch ................. F04D 29/0563 |
| | | | | 384/397 |
| 2015/0300411 | A1 | | 10/2015 | Tomura |
| 2016/0265426 | A1 | | 9/2016 | Annati et al. |
| 2019/0203727 | A1 | * | 7/2019 | Perrino ..................... F16N 7/18 |
| 2022/0235778 | A1 | * | 7/2022 | Schofield .............. F01D 25/164 |

FOREIGN PATENT DOCUMENTS

| | | | | | |
|---|---|---|---|---|---|
| CN | 204477051 | U | | 7/2015 | |
| CN | 106062392 | A | | 10/2016 | |
| CN | 108708907 | A | | 10/2018 | |
| CN | 106133355 | B | | 4/2019 | |
| DE | 1775479 | A1 | | 8/1971 | |
| DE | 3330473 | A1 | | 5/1984 | |
| DE | 3211715 | C2 | | 6/1985 | |
| EP | 0335779 | A1 | | 2/1989 | |
| EP | 1471261 | A2 | | 3/2004 | |
| EP | 1610012 | A1 | | 5/2005 | |
| EP | 2557315 | A2 | | 2/2013 | |
| EP | 2600005 | A1 | | 6/2013 | |
| FR | 2136664 | A5 | | 12/1972 | |
| GB | 1501542 | | | 2/1978 | |
| GB | 2019823 | A | | 11/1979 | |
| JP | S59131700 | U | | 9/1984 | |
| JP | H0923607 | A | | 1/1997 | |
| JP | 2003343588 | A | * | 12/2003 | ......... F16C 33/6677 |
| JP | 2007211753 | A | | 8/2007 | |
| JP | 2008121889 | A | | 5/2008 | |
| JP | 2011112190 | A | | 6/2011 | |
| JP | 2015218835 | A | | 12/2015 | |
| JP | 6730786 | B2 | | 7/2020 | |
| WO | 2018025023 | A1 | | 2/2018 | |
| WO | WO-2018046912 | A1 | * | 3/2018 | ......... F16C 33/6685 |

OTHER PUBLICATIONS

British Examination Report dated Mar. 31, 2025 for corresponding British application Serial No. GB2403222.9, 4 pages.
British Combined Examination Report dated Jul. 18, 2022 and Search Report dated Jul. 15, 2022 for corresponding British Application No. GB2202041.6, 6 pages.
PCT Notification of Transmittal of the International Search Report and the Written Opinion of the International Searching Authority, or the Declaration and PCT Search Report dated Apr. 25, 2023 for corresponding PCT application Serial No. PCT/GB2023/050331, 6 pages.
British Examination Report dated Mar. 7, 2024 for corresponding British Application No. GB2212169.3, 4 pages.
British Combined Search and Examination Report dated Jan. 25, 2023 and Search Report dated Jan. 24, 2023 for corresponding British Application No. GB2212169.3, 6 pages.
PCT Written Opinion dated Apr. 25, 2023 for corresponding PCT application Serial No. PCT/GB2023/050331, 6 pages.
Japanese Office Action dated Jul. 24, 2025 for corresponding Japanese application Serial No. 2024-542304, 3 pages.
British Examination Report dated Aug. 22, 2024 for corresponding British application Serial No. GB2403222.9, 4 pages.

\* cited by examiner 20   26   50   51   30   52

25

S10 — Mount rollable elements within inner and outer rings to form a bearing

S20 — Attach a bearing support to the outer ring of the bearing

S30 — Attach a lubricant directing element to the inner ring of the bearing

S40 — inspect/clean and test bearing assembly

PUMP, A BEARING ASSEMBLY FOR A PUMP AND A METHOD OF ASSEMBLING THE BEARING ASSEMBLY

CROSS-REFERENCE OF RELATED APPLICATION

This application is a Section 371 National Stage Application of International Application No. PCT/GB2023/050331, filed Feb. 14, 2023, and published as WO 2023/156765 A1 on Aug. 24, 2023, the content of which is hereby incorporated by reference in its entirety and which claims priority of British Application No. 2202041.6, filed Feb. 16, 2022 and British Application No. 2212169.3, filed Aug. 22, 2022.

FIELD

The field of the invention relates to a bearing assembly for a pump, a method of assembling a bearing assembly and to a pump comprising such a bearing assembly.

BACKGROUND

Pumps with oil lubricated bearings are often restricted to limited operating orientations to enable the oil circuit to be maintained and isolated from the pumping mechanism. Certain applications require additional operating orientations that a standard product cannot support. In this regard in a standard product the pump is orientated so that the axis of rotation is vertical and the oil lubricated bearing is located below the rotor. In an upside-down orientation the oil lubricated bearing is above the rotor, while in a pump configured to operate in any orientation pump the axis of rotation may be horizontal or any angle between horizontal and vertical. To support such orientations a method of distributing oil throughout the oil circuit, regardless of pump orientation is required. This problem has been addressed in some applications with the use of an oil flinger.

An oil flinger is attached to the shaft of the pump and is arranged to impede oil from travelling along the shaft acting to direct it away from the shaft. Positioning the flinger on the shaft presents some assembly challenges and may unbalance the rotor dynamics of the pump requiring it to be rebalanced when the flinger is replaced.

The discussion above is merely provided for general background information and is not intended to be used as an aid in determining the scope of the claimed subject matter. The claimed subject matter is not limited to implementations that solve any or all disadvantages noted in the background.

SUMMARY

A first aspect provides a bearing assembly for mounting a rotatable shaft of a pump, said bearing assembly comprising: a bearing comprising an inner ring and an outer ring and a plurality of rollable elements mounted between said inner and outer rings; a lubricant directing element extending radially outwards from an outer circumference of said inner ring, said lubricant directing element comprising a radially extending surface, at least a portion of said radially extending surface facing an annular gap between said inner and outer rings.

A lubricant directing element or oil flinger that extends radially out from the inner ring portion of a bearing assembly allows the element to rotate and provide the flinging action without the element being attached directly to the shaft. This arrangement allows the balancing required by the presence of the lubricant directing element to be done on the bearing assembly prior to fitting the bearing assembly to the pump. It also allows the lubricant directing element to be mounted on the pump with the bearing assembly and avoids the need for an additional mounting step. Additionally when the lubricant directing element needs to be replaced, it can be replaced with the bearing assembly. This allows the oil flinger to be replaced without requiring alterations to the pump. Furthermore, providing a conventional pump with such a novel bearing assembly allows the pump to be retro fitted with an oil flinger.

The lubricant directing element is arranged such that it comprises a radially extending surface that extends at least partially across an annular gap between the inner and outer ring which annular gap contains the rollable elements so that lubricant such as oil flowing through this gap contacts the lubricant directing element and is directed away from the shaft that the bearing assembly supports. This arrangement allows lubricant to be directed away from the shaft both when the pump is operational and the lubricant directing element is rotating and when the pump is not operational and the element is stationary.

In some embodiments said radially extending surface that faces said rollable elements is a sloped surface, a radially inner portion of said radially extending surface being closer to said rollable elements than a radially outer portion of said radially extending surface.

A sloped or angled surface helps direct the lubricant away from the bearing, this may be particularly advantageous when the pump is not operational and there is no centrifugal force being exerted on any lubricant contacting the surface.

In some embodiments, said lubricant directing element is located towards an axial end of said inner ring.

In some embodiments, said lubricant directing element comprises a drip edge on a surface facing away from said rollable elements.

One potential problem that may arise particularly when the pump is stationary is that oil or lubricant that due to surface tension clings to the lubricant directing element, may flow down the radially outer surface and then along the surface facing away from the bearing towards the shaft. In some embodiments, such flow is impeded by providing a drip edge on the surface facing away from the bearing. The drip edge provides an impediment to flow such that the lubricant will collect at this point and form droplets which will then fall from the surface. The drip edge may be an angled surface, some form of undulation, lip or recess.

In some embodiments, said surface facing away from said rollable elements comprises an annular recess, an edge of said annular recess comprising said drip edge.

An annular recess or groove in a surface of the lubricant directing element facing away from the bearing provides a drip edge for oil or lubricant that due to surface tension clings to the lubricant directing element and moves along this surface. It is particularly effective when the pump is not operational and the lubricant or oil is not being flung from the lubricant directing element by rotational forces.

In some embodiments, said annular recess comprises a radially inner edge that is between 30 and 70% of a distance between a radially inner and a radially outer edge of said surface facing away from said rollable elements.

It may be advantageous if the drip edge which in some embodiments may be the inner edge of the recess or groove is at a distance from the shaft when the bearing is mounted on the shaft, such that lubricant does not approach the shaft before dripping from the surface. If the drip edge is at some distance from the inner radius of the inner ring then when the bearing is mounted in a pump, the housing of the pump may extend beyond the drip edge in some embodiments the inner edge of the recess, such that lubricant drops onto the housing and is impeded from flowing between the housing and the shaft.

In some embodiments, a radially extending surface of said lubricant directing element furthest from said rollable elements is flush with or extends axially beyond a radially extending surface of said inner ring furthest from said rollable elements.

It may be advantageous if the lubricant directing element is flush or extends slightly beyond an axial end of the inner ring of the bearing. In this regard, when mounting the bearing on the pump having it flush with or extending slightly beyond an end of the inner ring may help locate the bearing assembly on the shaft, where it is mounted within a recess on the shaft. Where the lubricant directing element is formed of a softer material than the inner ring of the bearing assembly, such as polymer, then having it extend slightly beyond the inner ring may help pinch it into position and clamp it.

In some embodiments, a portion of said inner ring comprises a thinner portion with a reduced outer diameter at a portion to which said lubricant directing element is attached.

Mounting the lubricant directing element on a reduced diameter thinner portion of the inner ring allows it to provide an axial backstop function. This axial backstop function can help resist excessive movement within the bearing and consequently within the rotor in the rare event of a bearing failure, thereby preventing or at least inhibiting a clash and subsequent damage of the rotating mechanism.

In some embodiments, said lubricant directing element is integral with said inner ring.

Having a lubricant directing element integral with the inner ring, may make for ease of manufacture and also provide a robust solution.

In other embodiments, said lubricant directing element comprises an annular form and is attached to said inner ring.

Alternatively, the lubricant directing element may be a separate element mounted on or attached to the inner ring. This may make it easier to assemble the bearing particularly where a bearing support such as a compact metal spring damper is used.

The lubricant directing element may be attached to the inner ring in a number of ways and these may include at least one of press fit, a clearance fit, an interference fit, bonding, staking, circlips or gluing.

In some embodiments, said lubricant directing element is formed of one of a polymer, a composite or a metal.

In some embodiments, said inner ring comprises an axially extending portion extending axially beyond said outer ring, said lubricant directing element being attached to said axially extending portion; said bearing assembly further comprising: a bearing support configured to support said outer ring of said bearing, said bearing support surrounding at least a portion of an outer surface of said outer ring and comprising a radially extending portion extending across one end surface of said outer ring towards said axially extending portion of said inner ring to thereby obscure at least a portion of said annular gap between said inner and outer ring; wherein said lubricant directing element is located further from said rollable elements than said radially extending portion of said bearing support.

A bearing assembly may be configured with a bearing support. Advantageously that bearing support may comprise a shield portion that extends radially across the annular gap between the inner and outer ring, this shield portion can help provide some lubricant retention and can also be configured to provide robust axial and/or radial end stop protection. Having a shield that extends from the bearing support rather than one of the rings makes the bearing assembly easy to manufacture and assemble.

Although the bearing support may provide some lubricant retention, where it is used on a pump that is configured to operate in different orientations it is important that there is at least one route for the lubricant to exit the bearing, thus, in some embodiments, said radially extending portion of said bearing support comprises a plurality of apertures configured to allow passage of lubricant between an interior of said bearing and an exterior of said bearing.

As noted above, for the bearing assembly to function when the pump is arranged in different orientations passages for lubricant to exit the bearing are advantageous. In some embodiments, these are provided via apertures within the bearing support. The number of apertures may be selected to provide appropriate strength of the bearing support such that it provides robust axial and/or radial end stop protection but also allow sufficient passage of lubricant when the pump is arranged in different orientations.

In some embodiments, said plurality of apertures comprise at least three apertures, preferably at least nine.

It has been found that three or more apertures may be sufficient to reduce pooling of the lubricant within the bearing even when the pump is orientated horizontally, however nine apertures have been found to be particularly advantageous.

In some embodiments, said lubricant directing element is configured to extend radially beyond at least a radially inner portion of said plurality of apertures.

In order for the lubricant directing element to provide effective directing of the lubricant it may be advantageous for it to extend beyond a radially inner portion of the apertures.

In some embodiments, said axially extending portion of said inner ring comprises a recessed portion with a reduced outer diameter, said radially extending portion of said bearing support extending into said recessed portion.

In some embodiments, an innermost surface of said radially extending portion of said bearing support forms one side of a clearance gap with an outer surface of said reduced diameter portion of said inner ring.

The radially extending portion of the bearing support is configured to provide at least one of an axial and radial end stop in case of failure of said bearing. The lubricant directing element may provide a further axial end stop.

In some embodiments, the bearing support may be a compact spring metal damper.

In some embodiments, said outer diameter of said inner ring at a portion to which said lubricant directing element is attached is smaller than said outer diameter of said recessed portion into which said bearing support extends.

Arranging the lubricant directing element on a portion of the outer ring with a smaller diameter than the recessed portion into which the bearing support extends allows the lubricant directing element to provide a further axial end stop and also helps locate the different elements both when assembling the bearing assembly and mounting it to the shaft of the pump.

A second aspect provides a pump comprising at least one rotatable shaft supporting a rotor within a stator, said at least one rotatable shaft being mounted on at least one bearing assembly according to a first aspect.

In some embodiments, said pump comprises a lubricant reservoir on one axial side of said bearing assembly and a lubricant collection mechanism on the other axial side, said lubricant directing element being configured to direct lubricant onto said lubricant collection mechanism, said pump further comprising a lubricant transport mechanism for transporting said lubricant from said lubricant collection mechanism to said lubricant reservoir.

Lubricant used in the lubrication of the bearings may be re-circulated using lubricant collection and lubricant transport mechanisms such that the lubricant directing element directs the lubricant to the lubricant collection mechanism and the lubricant transport mechanism transports the lubricant from the collection mechanism to the lubricant reservoir whereupon the lubricant is reused in the lubrication of the pump. The collection and transport mechanisms and indeed the reservoir may be felts or fibrous materials with a storage and wicking function. The collection and recirculation of the lubricant helps maintain a sufficient amount of lubricant within the system and inhibits the lubrication of the bearings from becoming intermittent and the bearings being damaged.

In some embodiments, the pump comprises a vacuum pump, in some embodiments a turbomolecular pump.

In some embodiments, the pump comprises a vacuum pump configured for operation in multiple orientations.

It is important with a vacuum pump that the lubricant used to lubricant the bearings is inhibited from leaking into the pumping chamber and contaminating the vacuum. Thus, embodiments are particularly applicable to vacuum pumps where the lubricant directing elements helps protect the pumping chamber from the ingression of lubricant.

Vacuum pumps configured for operation in multiple orientations and indeed vacuum pumps that may be transported and stored in multiple orientations are at particular risk from leakage of oil and thus, the lubricant directing elements of the embodiments are particularly effective in such vacuum pumps.

A third aspect provides a method of assembling a bearing assembly according to a first aspect, comprising assembling a bearing by mounting rollable elements within inner and outer rings; attaching a lubricant directing element having an annular form to an inner ring of said bearing such that said lubricant directing element extends radially outwards from an outer circumference of said inner ring.

In some embodiments, said inner ring comprises an axially extending portion extending axially beyond said outer ring; and said method comprises a further step performed prior to said step of attaching said lubricant directing element of: attaching a bearing support to said outer ring of said bearing, said bearing support comprising a radially extending portion extending across one end surface of said outer ring towards said axially extending portion of said inner ring to thereby obscure at least a portion of said annular gap between said inner and outer ring; and then performing said step of attaching said lubricant directing element, said lubricant directing element being attached to at a position that is axially more remote from said rollable elements than said radially extending portion of said bearing support, such that at least a portion of said radially extending portion of said bearing support lies between said rollable elements and said lubricant directing element.

A bearing assembly assembled according to the above method is assembled such that the lubricant directing element is part of the bearing assembly. In some embodiments a bearing support is also part of the assembly and in place before it is mounted on the pump. This allows the bearing assembly to be balanced, cleaned, inspected and tested before mounting in a pump. The bearing assembly may be mounted on the pump during manufacture of the pump or during servicing where the bearing may be replaced.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

The Summary is provided to introduce a selection of concepts in a simplified form that are further described in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the present invention will now be described further, with reference to the accompanying drawings, in which.

DETAILED DESCRIPTION

Before discussing the embodiments in any more detail, first an overview will be provided.

A bearing assembly with an integrated lubricant directing element or oil flinger is disclosed. Providing a bearing assembly with an oil flinger potentially provides several benefits. These may include provision of an axial backstop, protection from lubricant reaching the shaft, direction of lubricant towards a desired lubricant transport path, ability to select appropriate materials for the flinger which materials may be dissimilar to the materials of the bearing, retrofitting of the oil flinger to a pump when fitting a new bearing assembly and enhanced quality and vibration characteristics as such a bearing assembly may be tested prior to assembly within the pump.

Where a bearing support is used that comprises a bearing shield, such as the compact metal spring damper disclosed in GB2019823 the entire contents of which are incorporated herein by reference, then oil drain holes in the shield portion of the bearing support may be provided.

In existing any-orientation bearing arrangements, an oil flinger may be used to distribute oil that has passed through the bearing away from the pump shaft and inhibit transmission of oil to the pump mechanism. The flinger is conventionally a separate component fitted to the pump shaft before the bearing assembly is added. This requires modification to the shaft and makes the oil flinger difficult to replace during servicing. Due to the design of the bearing and position of the oil flinger inside the pump it is also difficult to know if the assembly is correct as the bearing obfuscates the view. Incorrect assemblies may result in oil transmission or vibration generation, both may be difficult to observe and catch before the product is shipped for use.

At least some of these problems have been addressed by the integration of the lubricant directing element or oil flinger within the bearing assembly.

Figure 1:
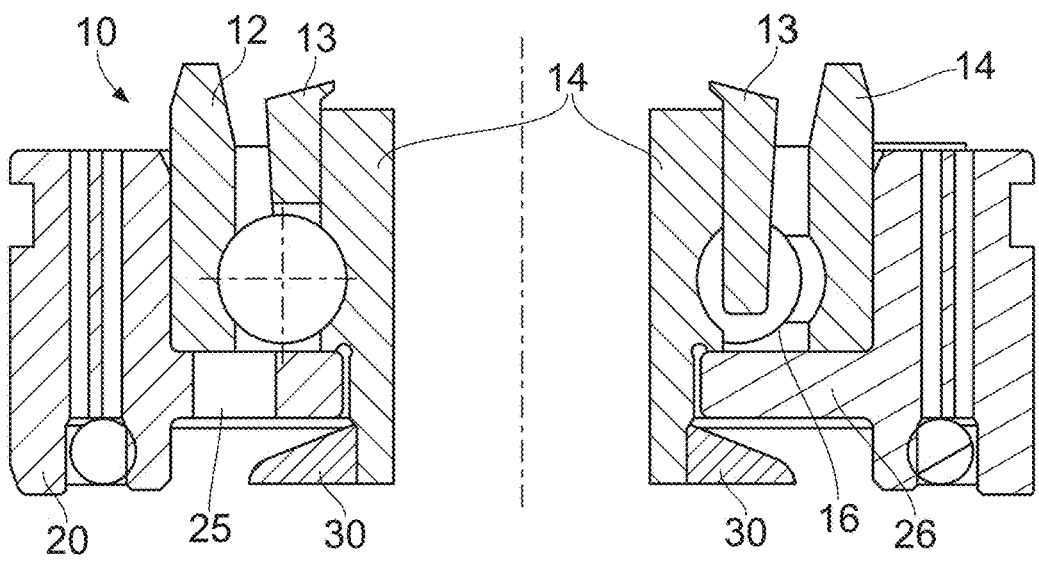
FIG. 1 shows a bearing assembly with an integrated oil flinger according to an embodiment.

FIG. 1 shows a bearing assembly 10 with integrated oil flinger 30. In this embodiment the oil flinger 30 is a separate part to help simplify the assembly of the bearing assembly component 10. The bearing assembly 10 comprises an outer race or ring 12, a cage 13 for retaining the rolling elements or balls 16, and an inner race or ring 14. The inner race 14 is configured to be mounted to a shaft of a pump and to rotate with that shaft. The inner race 14 has an oil flinger 30 attached to the outer surface at an axial end. The bearing assembly is supported within a bearing support 20, which in this embodiment is a compact metal spring damper CMSD. The bearing support 20 comprises a shield 26 that is integral with the bearing support 20 and provides some protection against oil loss from the bearing to the pump. In this embodiment the shield 26 comprises at least one aperture 25 to allow some loss of oil from the bearing, this is required where the pump is operating in an inverted or horizontal position to inhibit pooling of oil within the bearing. There is a clearance gap between the radial inner wall of the shield 26 and the outer wall of the inner ring 14. In this embodiment, the shield 26 extends into a recess in the outer surface of the inner ring 14 such that there is an axial clearance gap and a radial clearance gap between the inner ring and the shield 26. Were the bearing to fail then axial and radial movement would be limited by the size of these clearance gaps and thus this bearing may provide both an axial in at least one direction and a radial backup bearing for the pump.

The oil flinger 30 is mounted at an axial end of the inner ring in a further recess and provides an additional axial stop. In embodiments where the bearing is not mounted in a support with a shield 26, then the oil flinger 30 may provide an axial stop on its own.

In this embodiment the oil flinger 30 is fitted to the inner race 14 once the bearing has been inserted into the support 20. Once fitted onto the bearing assembly 10 the flinger 30 and bearing assembly can be tested together prior to build into a product, this can be undertaken at the bearing manufacturer which ensures quality components are shipped ready for build.

Testing of the full assembly with integrated oil flinger can provide greater assurance that part quality is maintained after fitment of the flinger. It is possible that, if an interference fit is used to control radial location of the flinger, burrs or debris may be generated as the part is pressed onto the inner race. It may be possible to clean the assembly after fitment of the bearing to remove any debris that may have been generated prior to test. This might not be possible if the assembly was made in the production facility of the pump.

The material used to make the flinger will define the interference fit required onto the bearing for control of the component in all operating conditions and rotational speeds.

Alternatively, the flinger could be attached to the bearing assembly in some other way, e.g. bonding with adhesive, staking, circlips etc.

Assembly of the flinger and subsequent bearing testing by the manufacturer ensures product quality has been maintained.

Having an oil flinger integrated into the bearing assembly allows the new assembly to be retro-fitted to existing and legacy products within the field. If the flinger is fitted to the pump shaft this would not be possible as an appropriately sized journal, onto which the flinger is pressed, would be required on the shaft.

With an oil flinger added to the assembly, direct oil transfer if the pump is orientated upside-down is prevented or at least inhibited.

Figure 2:
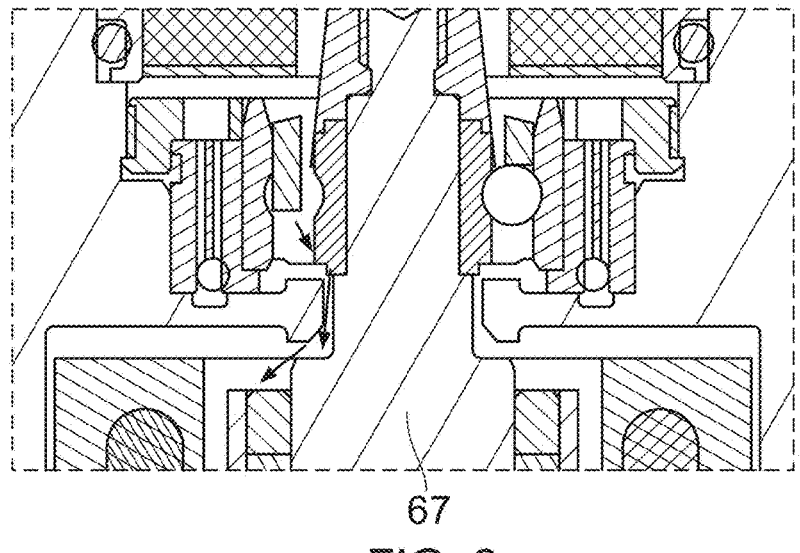
FIG. 2 schematically shows lubricant leakage where a pump is orientated upside down and there is no oil flinger.
Figure 3:
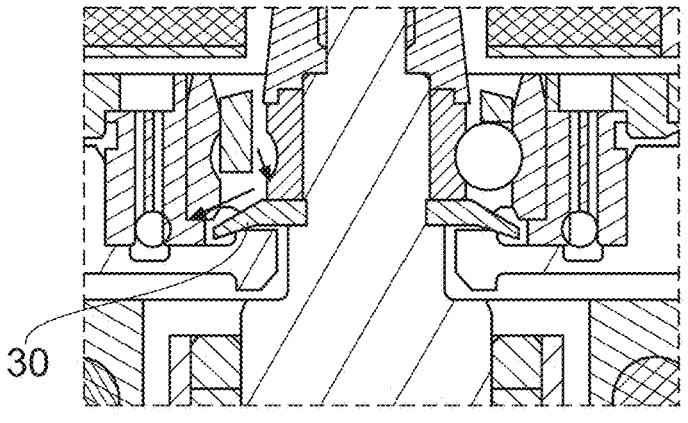
FIG. 3 schematically shows how lubricant flow changes when an oil flinger is added to the pump of FIG. 2.

FIG. 2 shows the passage of lubricant without an oil flinger and how it passes along the shaft 67 towards the pumping chamber, while FIG. 3 shows how with the addition of the oil flinger 30, the oil is diverted away from the shaft 67 and away from the pumping chamber.

A pump having a bearing assembly with an oil flinger is beneficial as the flinger can help inhibit oil transfer from the bearing to pumping mechanism, including during storage or transportation. The flinger provides an obstruction to direct oil transfer if the pump is orientated upside down. In standard bearings oil can leak past the bearing shield and along the shaft into the motor area, it may travel into the pumping mechanism or out of the pump exhaust, in any case the supply of lubricant for lubricating the bearing is diminished and may result in bearing failure. A bearing assembly with integrated flinger provides a cover over the shaft area reducing the risk of oil transfer and keeping oil within the correct area of the pump.

With a flinger fitted to the bearing assembly the flinger can also help suppress gas transfer into the bearing area during operation helping reduce contamination of the oil by pumped gases.

In a conventional design with a flinger attached to the shaft, if the flinger has been omitted from build it is very difficult to detect within production and may not be noted until the pump starts to lose oil later during operation, leading to product reliability issues.

If the flinger is integrated with the bearing assembly, it provides a poke yoke solution to guarantee it will not be forgotten during construction of the pump and can be easily checked prior to assembly into the pump or during service.

Figure 4:
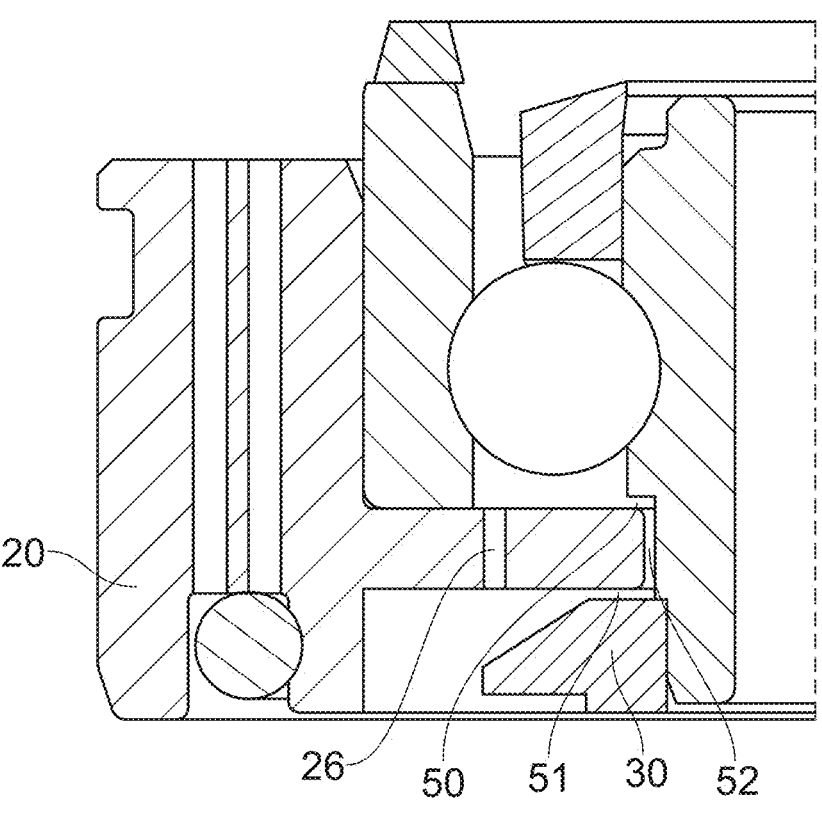
FIG. 4 schematically shows how the oil flinger may act as an axial backstop.

As noted above adding the flinger to the bearing assembly can also provide an axial stop 51 to the bearing. FIG. 4 schematically shows a section through one side of a bearing with the rotor shaft being on the right of the figure and illustrates how the shield 26 of the bearing support 20 provides an axial 50 and radial 52 end stop for the bearing. The oil flinger 30 provides an additional axial stop 51. This allows excessive movement within the pump to be controlled by the bearing assembly and also provides a safety mechanism in the unlikely event that the bearing were to fail. This is particularly useful for retrofitting the bearing into legacy products as additional security and robustness can be provided without any other modifications to the pump.

It should be noted that although in this embodiment the oil flinger 30 is shown underneath the CMSD shoulder or shield 26, and it is the inner portion of the flinger creating the backstop, the axial backstop could be provided by any portion of the flinger. However, the inner portion provides a particularly effective back stop due to its robustness. The surface speed of the inner portion is lower than the outer portion leading to a lower relative surface speed as it would be touching a static surface. Furthermore, it is the thicker section of the flinger that is contacted and it would be compressed between the CMSD shoulder making it effective at resisting movement. If it were the tip of the flinger acting as the back stop then one side would be unsupported, making it easier to distort.

The material selected for the flinger will affect its operation as an axial backstop and a suitably robust material such as a polymer, composite or metal may be advantageous.

In a conventional any-orientation pump design an oil flinger is fitted onto the pump shaft, and when the pump is serviced the oil flinger needs to be replaced to prevent excessive creep or deterioration from pumped media. Removal and refitting of the flinger can upset the vibration and rotordynamics of the product and ultimately require the pump to be rebalanced to ensure smooth operation post servicing.

Adding the oil flinger to the bearing assembly or providing a bearing assembly with an oil flinger integral with the inner bearing ring mitigates these issues as the bearing has already been tested when manufactured, reducing the possibility of vibration or rotordynamic issues of the pump post field service.

Removal and then fitment of the conventional oil flinger can be particularly difficult requiring special tooling to guarantee it has been correctly placed and to minimise creation of debris/contamination during the process. Providing a bearing assembly with a flinger mitigates these risks.

Figure 5:
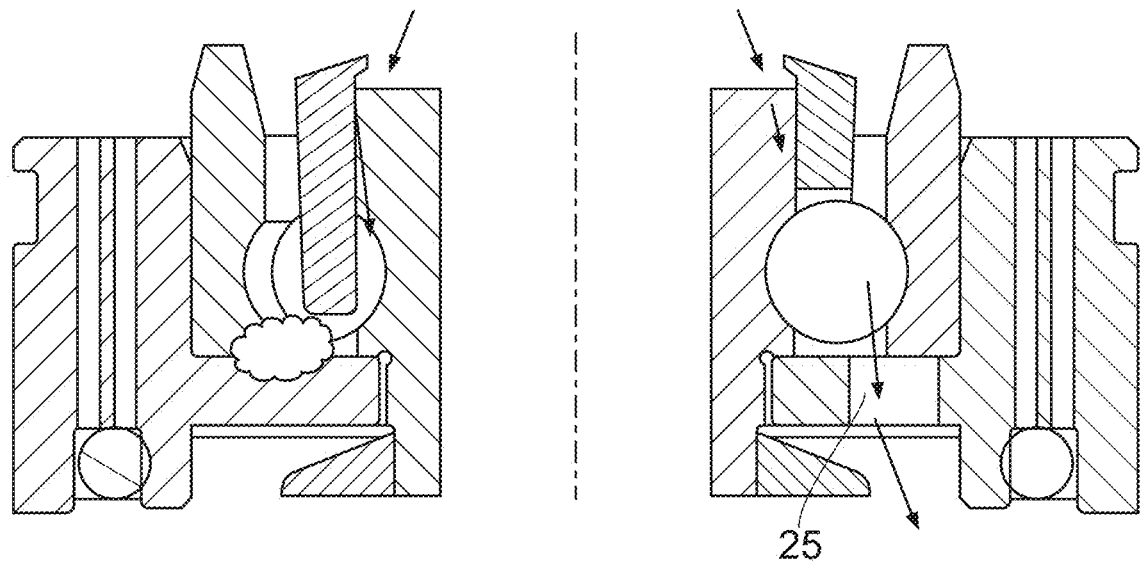
FIG. 5 shows how oil build up might occur were a bearing support without a lubricant flow path to be used and the pump operated in an inverted position.

The oil flinger of embodiments is also configured to act in conjunction with an oil collection and transport mechanism to provide an oil recirculation path. In this regard the oil entering the bearing assembly must be allowed to leave in order to prevent build-up and high power draw. In vertical (upright) and to some extent horizontal pump use, the oil enters and leaves from the bottom of the bearing assembly. When inverted running becomes a possibility, the oil will try to fall under gravity and build up close to the balls see FIG. 5 left hand drawing. Oil relief holes 25 see right hand drawing will allow the oil to pass through the bearing, onto the flinger (rotating or stationary, depending on the pump operation) and from there into the recirculating felt system.

The number, position, size and shape of the holes affect the oil level within the bearing and the flow rate through the bearing, it will also affect the strength of the shield 26. The location & orientation of the pump will also affect the oil build up. For example, with the pump mounted horizontally, it may be important to have a sufficient number of drain holes so that one hole is towards the bottom. At least three holes is found to work well, with 9 being preferable. In this regard the more holes that there are the more flexibility you have in the orientation that the bearing assembly can be mounted in.

Figure 6:
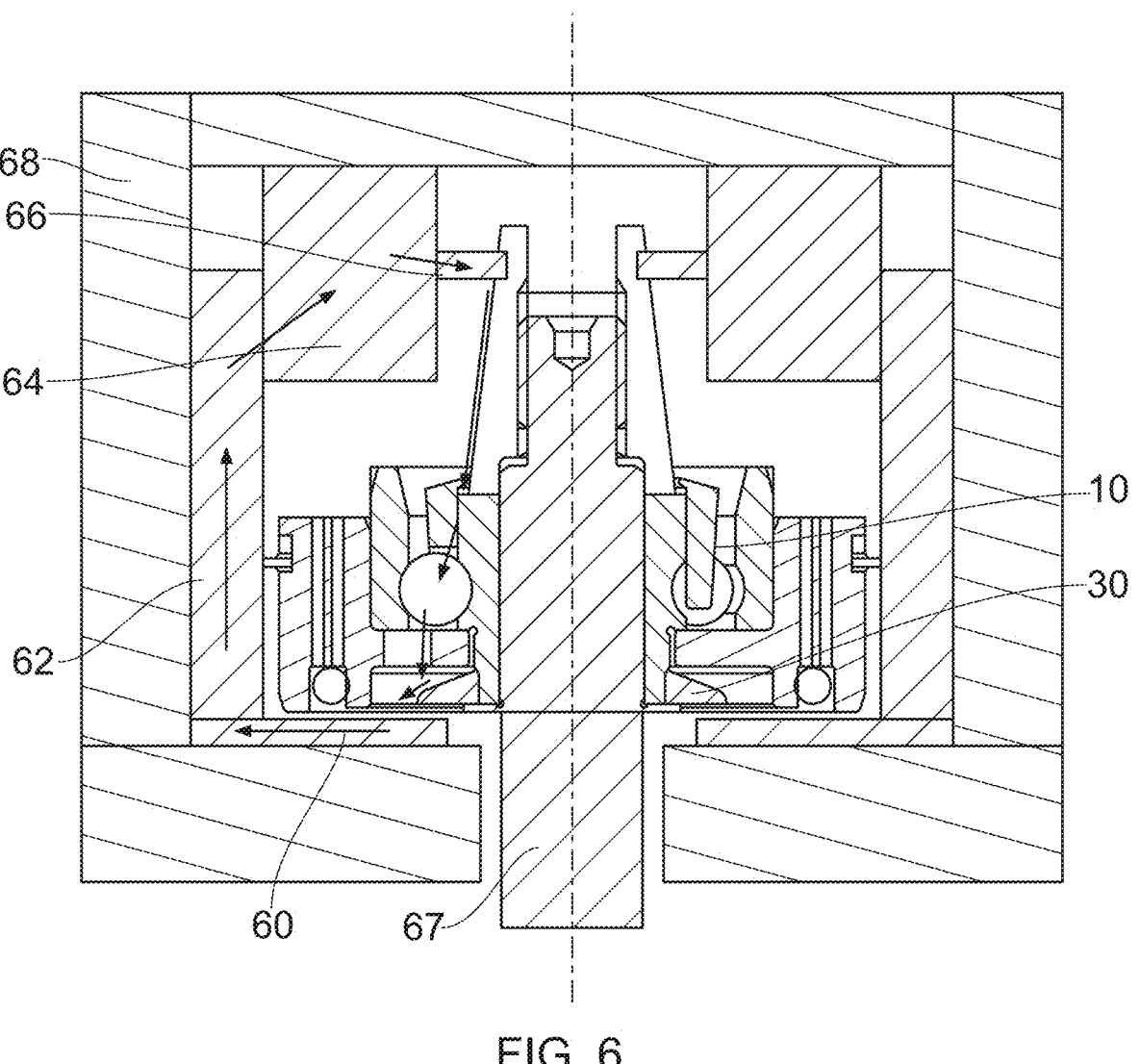
FIG. 6 shows the lubricant collection and transport mechanisms.

FIG. 6 shows the oil recirculation path provided in a pump according to an embodiment when the pump is orientated upside down, that is with the bearings 10 that support rotor shaft 67 located vertically above the motor and pumping mechanism. The bearing assembly 10 is within pump housing 68 and has an oil flinger 30 that impedes oil from flowing along the shaft towards the motor and directs the oil towards oil collection mechanism 60 such that it can be recirculated and reused lubricating the bearings. Oil is wicked from the collection mechanism 60 by oil transport mechanism 62 that is a felt, towards oil reservoir 64. There is an oil delivery means 66 that directs oil from the reservoir 64 to towards the bearings.

Figure 7:
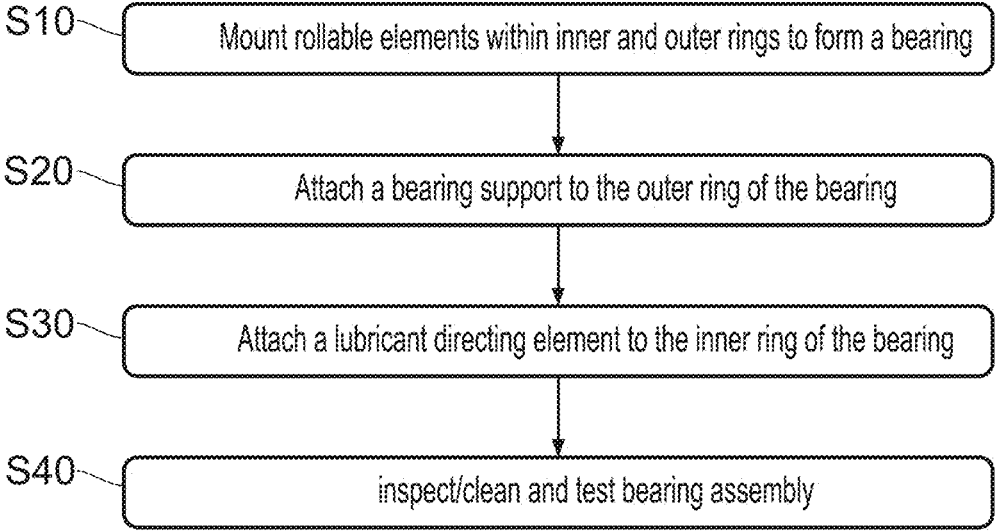
FIG. 7 provides a flow diagram illustrating steps in a method of assembling a bearing assembly according to an embodiment.

FIG. 7 schematically shows a method of assembling a bearing assembling according to an embodiment. In the initial step S10 the bearing is formed by mounting rollable elements such as balls within inner and outer rings or races, such that the inner and outer rings can rotate with respect to each other.

In some embodiments an additional step S20 is performed of attaching a bearing support to the outer ring of the bearing. In some cases, the bearing support has a shield that extends radially across the annual gap between the inner and outer rings.

In a next step S30 a lubricant directing element is attached to the inner ring of the bearing such that it extends at least partially across the annular gap between the inner and outer rings. Where there is a bearing support then the lubricant directing element is mounted axially beyond the shield of the bearing support, such that it is further from the rollable elements than the shield.

There may then be an additional step S40 where the bearing assembly is cleaned, inspected and tested prior to mounting on the pump.

Figure 8:
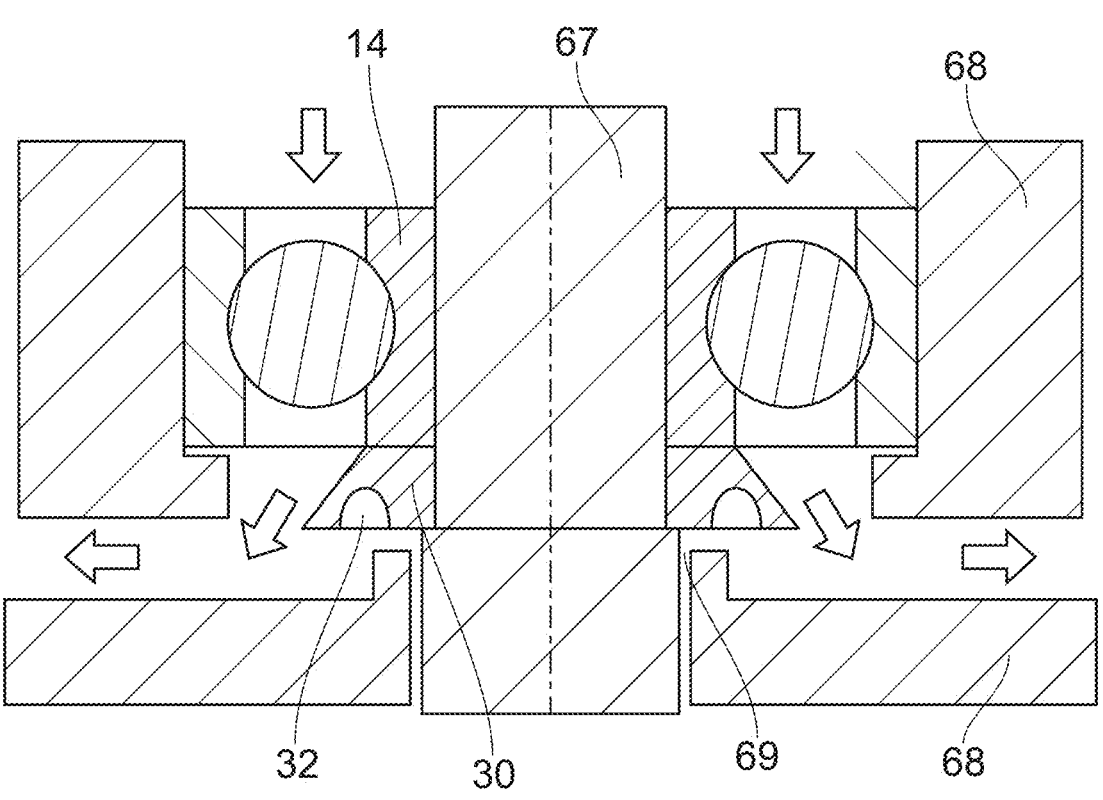
FIG. 8 schematically shows a bearing assembly with an integrated oil flinger according to an embodiment.

FIG. 8 shows a further embodiment of a bearing assembly where the oil flinger 30 is integral with the inner bearing ring 14. Having the oil flinger integral with the inner bearing ring, can make manufacture of the bearing simpler and provide a robust solution. In this embodiment the surface of the inner bearing ring 14 that faces away from the bearing and in this orientation is the lower surface of the bearing comprises an annular recess or groove 32. This groove or recess 32 acts as a drip edge for oil running down the deflector and along the lower surface when the rotor is not rotating. This annular recess 32 is arranged such that the radially inner edge of the recess is radially beyond the gap 69 between rotor shaft 67 and pump housing 68, so that any oil or lubricant dripping from this recess when the rotor is no longer rotating for example, falls onto the pump housing portion 68 rather than travelling along the surface of the inner ring towards the shaft and falling into the gap between housing and shaft and running along the shaft towards the pumping chamber.

The arrows in the figure represent oil flow during operation of the pump. The width of the bearing rings can be of different sizes and are generally configured to fit to the pump housing 68. The oil flinger or deflector 30 is configured to extend beyond the gap 69 between the pump housing 68 and the rotor shaft 67, with as noted above the groove or recess 32 presenting a drip edge to impede oil leakage along the surface facing away from the bearing to the shaft when the rotor is static.

The oil flinger 30 has in this embodiment a tapered or umbrella type shape and the radius of the oil flinger increases away from the bearing.

Figure 9:
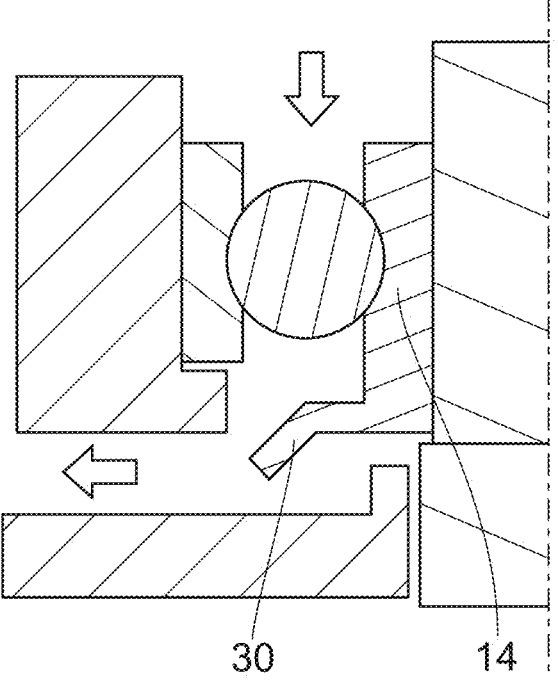
FIG. 9 schematically shows a further bearing assembly according to an embodiment.

FIG. 9 shows an alternative embodiment where the oil flinger and inner bearing ring are also formed as an integral piece. In this embodiment there is no recess on the surface of the oil flinger facing away from the bearing rather there is an angled lower edge surface which itself forms a drip edge. In this embodiment the shape of the flinger or deflector 30 although not tapered is still angled away from the shaft such that the radius of the deflector remote from the bearing is larger than the radius closer to the bearing, such that lubricant flowing along the deflector is deflected away from the shaft.

Although illustrative embodiments of the invention have been disclosed in detail herein, with reference to the accompanying drawings, it is understood that the invention is not limited to the precise embodiment and that various changes and modifications can be effected therein by one skilled in the art without departing from the scope of the invention as defined by the appended claims and their equivalents.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A bearing assembly for mounting a rotatable shaft of a pump, said bearing assembly comprising:

a bearing comprising an inner ring and an outer ring and a plurality of rollable elements mounted between said inner and outer rings;

a lubricant directing element extending radially outwards from an outer circumference of said inner ring, said lubricant directing element comprising a radially extending surface, at least a portion of said radially extending surface facing an annular gap between said inner and outer rings wherein said inner ring comprises an axially extending portion extending axially beyond said outer ring, said lubricant directing element being attached to said axially extending portion;

a bearing support configured to support said outer ring of said bearing, said bearing support surrounding at least a portion of an outer surface of said outer ring and comprising a radially extending portion extending across one end surface of said outer ring towards said axially extending portion of said inner ring to thereby obscure at least a portion of said annular gap between said inner and outer ring;

wherein said lubricant directing element is located further from said rollable elements than said radially extending portion of said bearing support.

2. The bearing assembly according to claim 1, wherein said radially extending surface is sloped, a radially inner portion of said sloped surface being closer to said rollable elements than a radially outer portion of said sloped surface.

3. The bearing assembly according to claim 1, wherein said lubricant directing element is located towards one end of said inner ring.

4. The bearing assembly according to claim 1, wherein said lubricant directing element comprises a drip edge on a surface facing away from said rollable elements.

5. The bearing assembly according to claim 4, wherein said surface facing away from said rollable elements comprises an annular recess, an edge of said annular recess comprising said drip edge.

6. The bearing assembly according to claim 5, wherein said drip edge is between 30 and 70% of a distance between a radially inner and a radially outer edge of said surface facing away from said rollable elements.

7. The bearing assembly according to claim 1, wherein a radially extending surface of said lubricant directing element furthest from said rollable elements is flush with or extends axially beyond a radially extending surface of said inner ring furthest from said rollable elements.

8. The bearing assembly according to claim 1, wherein said lubricant directing element is integral with said inner ring.

9. The bearing assembly according to claim 1, wherein said lubricant directing element comprises an annular form and is attached to said inner ring.

10. A method of assembling the bearing assembly according to claim 9, comprising:

assembling the bearing by mounting said rollable elements within said inner and outer rings;

attaching said lubricant directing element having an annular form to said inner ring of said bearing such that said lubricant directing element extends radially outwards from said outer circumference of said inner ring.

11. The bearing assembly according to claim 9, wherein a portion of said inner ring comprises a thinner portion with a reduced outer diameter at a portion to which said lubricant directing element is attached.

12. The bearing assembly according to claim 11, wherein said lubricant directing element is attached to said inner ring by at least one of a press fit, a clearance fit, an interference fit, bonding, staking, circlips or gluing.

13. The bearing assembly according to claim 1, wherein said radially extending portion of said bearing support comprises a plurality of apertures configured to allow passage of lubricant between an interior of said bearing and an exterior of said bearing.

14. The bearing assembly according to claim 13, wherein said plurality of apertures comprise at least three apertures.

15. The bearing assembly according to claim 13, wherein said lubricant directing element is configured to extend radially beyond at least a radially inner portion of said plurality of apertures.

16. The bearing assembly according to claim 1, said axially extending portion of said inner ring comprises a recessed portion with a reduced outer diameter, said radially extending portion of said bearing support extending into said recessed portion.

17. The bearing assembly according to claim 16, wherein an innermost surface of said radially extending portion of said bearing support forms one side of a clearance gap with an outer surface of said reduced diameter portion of said inner ring.

18. The bearing assembly according to claim 16, wherein a radially extending surface of said lubricant directing element furthest from said rollable elements is flush with or extends axially beyond a radially extending surface of said inner ring furthest from said rollable elements and wherein said outer diameter of said inner ring at a portion to which said lubricant directing element is attached is smaller than said outer diameter of said recessed portion into which said bearing support extends.

19. A pump comprising at least one rotatable shaft supporting a rotor within a stator, said at least one rotatable shaft being mounted to at least one bearing assembly according to claim 1.

20. The pump according to claim 19, wherein said pump comprises a lubricant reservoir on one axial side of said bearing assembly and a lubricant collection mechanism on the other axial side, said lubricant directing element being configured to direct lubricant onto said lubricant collection mechanism, said pump further comprising a lubricant transport mechanism for transporting said lubricant from said lubricant collection mechanism to said lubricant reservoir.

21. The pump according to claim 19, said pump comprising a vacuum pump configured for operation in multiple orientations.

* * * * *